(12) United States Patent
Hwang

(10) Patent No.: US 6,674,272 B2
(45) Date of Patent: Jan. 6, 2004

(54) CURRENT LIMITING TECHNIQUE FOR A SWITCHING POWER CONVERTER

(75) Inventor: Jeffrey H. Hwang, Saratoga, CA (US)

(73) Assignee: Champion Microelectronic Corp., Hsinchu (TW)

( * ) Notice: Subject to any disclaimer, the term of this patent is extended or adjusted under 35 U.S.C. 154(b) by 0 days.

(21) Appl. No.: 10/177,557

(22) Filed: Jun. 21, 2002

(65) Prior Publication Data

US 2003/0020442 A1 Jan. 30, 2003

Related U.S. Application Data

(60) Provisional application No. 60/300,492, filed on Jun. 21, 2001.

(51) Int. Cl.$^7$ ................................................ G05F 1/40
(52) U.S. Cl. ...................... 323/284; 323/285; 323/224
(58) Field of Search ............................... 323/288, 282, 323/283, 284, 285, 286, 222, 224; 363/89, 84, 90, 44, 21.04, 25, 26

(56) References Cited

U.S. PATENT DOCUMENTS

| | | | |
|---|---|---|---|
| 3,646,439 A | 2/1972 | Broski | 323/242 |
| 4,754,388 A | 6/1988 | Pospisil | |
| 5,012,401 A * | 4/1991 | Barlage | 363/97 |
| 5,396,165 A | 3/1995 | Hwang et al. | 323/210 |
| 5,459,652 A | 10/1995 | Faulk | |
| 5,565,761 A | 10/1996 | Hwang | 323/222 |
| 5,570,276 A | 10/1996 | Cuk et al. | 363/16 |
| 5,592,128 A | 1/1997 | Hwang | 331/61 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,831,418 A | 11/1998 | Kitagawa | 323/222 |
| 5,859,527 A | 1/1999 | Cook | |
| 5,894,243 A | 4/1999 | Hwang | 327/540 |
| 5,903,138 A | 5/1999 | Hwang et al. | 323/266 |
| 5,912,549 A | 6/1999 | Farrington et al. | 323/207 |
| 5,912,552 A | 6/1999 | Tateishi | 323/285 |
| 5,914,591 A * | 6/1999 | Yasuda et al. | 323/284 |
| 5,930,130 A | 7/1999 | Katyl et al. | |
| 6,060,867 A | 5/2000 | Farrington et al. | 323/222 |
| 6,091,233 A | 7/2000 | Hwang et al. | 323/222 |
| 6,140,808 A | 10/2000 | Massie | 323/284 |
| 6,166,528 A | 12/2000 | Rossetti et al. | 323/283 |
| 6,215,290 B1 | 4/2001 | Yang et al. | 323/282 |
| 6,307,356 B1 * | 10/2001 | Dwelley | 323/282 |
| 6,346,778 B1 | 2/2002 | Mason et al. | |
| 6,445,165 B1 | 9/2002 | Malik et al. | |

* cited by examiner

Primary Examiner—Rajnikant B. Patel
(74) Attorney, Agent, or Firm—Derek J. Westberg

(57) ABSTRACT

An improved technique for limiting current in a switching power converter. The switching power converter includes a soft-start circuit which slowly increases a switching duty cycle upon power-up. Once the converter is operating normally, the duty cycle is controlled to regulate the output voltage. In the event an excessive output current is detected, soft-start circuit is controlled to reduce the switching duty cycle. More particularly, a soft-start capacitor may be discharged during portions of a clock period used to control switching.

50 Claims, 7 Drawing Sheets

CURRENT LIMITING TECHNIQUE FOR A SWITCHING POWER CONVERTER

This application claims the benefit of U.S. Provisional Application Serial No. 60/300,492, filed Jun. 21, 2001.

FIELD OF THE INVENTION

The invention relates to switching power converters. More particularly, the invention relates to a technique for limiting current by limiting a switching duty cycle in such a power converter.

BACKGROUND OF THE INVENTION

In a conventional switching power converter, provision may be made for limiting current to a load in the event the load experiences a fault. For example, U.S. Pat. No. 5,742,151 discloses a PFC-PWM power converter in which the output current developed by the PWM section is limited in when an excessive output current is detected. More particularly, for each switch cycle, the switch is closed upon sensing an excessive output current. A drawback to this technique is that when the switch is opened for each switching cycle, an excessive current can occur before the switch is closed in response to the excessive current. This repeated occurrence of excessive current may cause excessive power dissipation in the converter.

What is needed is an improved current limiting technique for a switching power converter. It is to these ends that the present invention is directed.

SUMMARY OF THE INVENTION

The present invention is an improved technique for limiting current in a switching power converter. The power converter includes a switch for transferring energy from a source to the load by opening and closing the switch according to a duty cycle. A duty cycle limiter is triggered when the output current of the converter exceeds a predetermined level. The duty cycle is limited to an amount that is related to a degree to which the output current is excessive. In one aspect, the duty cycle limiter include a capacitor having a charge that is gradually changed in response to the output current exceeding the predetermined level where the duty cycle is related to a voltage on the capacitor. In another aspect, the duty cycle limiter includes a counter where the duty cycle is related to a count of the counter. In another aspect, the duty cycle limiter provides a soft-start in which the switching duty cycle is gradually increased upon powerup. Once the converter is operating normally, the duty cycle is controlled to regulate the output voltage.

The invention has an advantage in that by reducing the switching duty cycle, the output current is reduced and is, thus, less likely to reach an excessive level upon each cycle of the switch. In comparisons to prior techniques, this reduces power dissipation in the converter.

DETAILED DESCRIPTION OF A PREFERRED EMBODIMENTS

Figure 1:
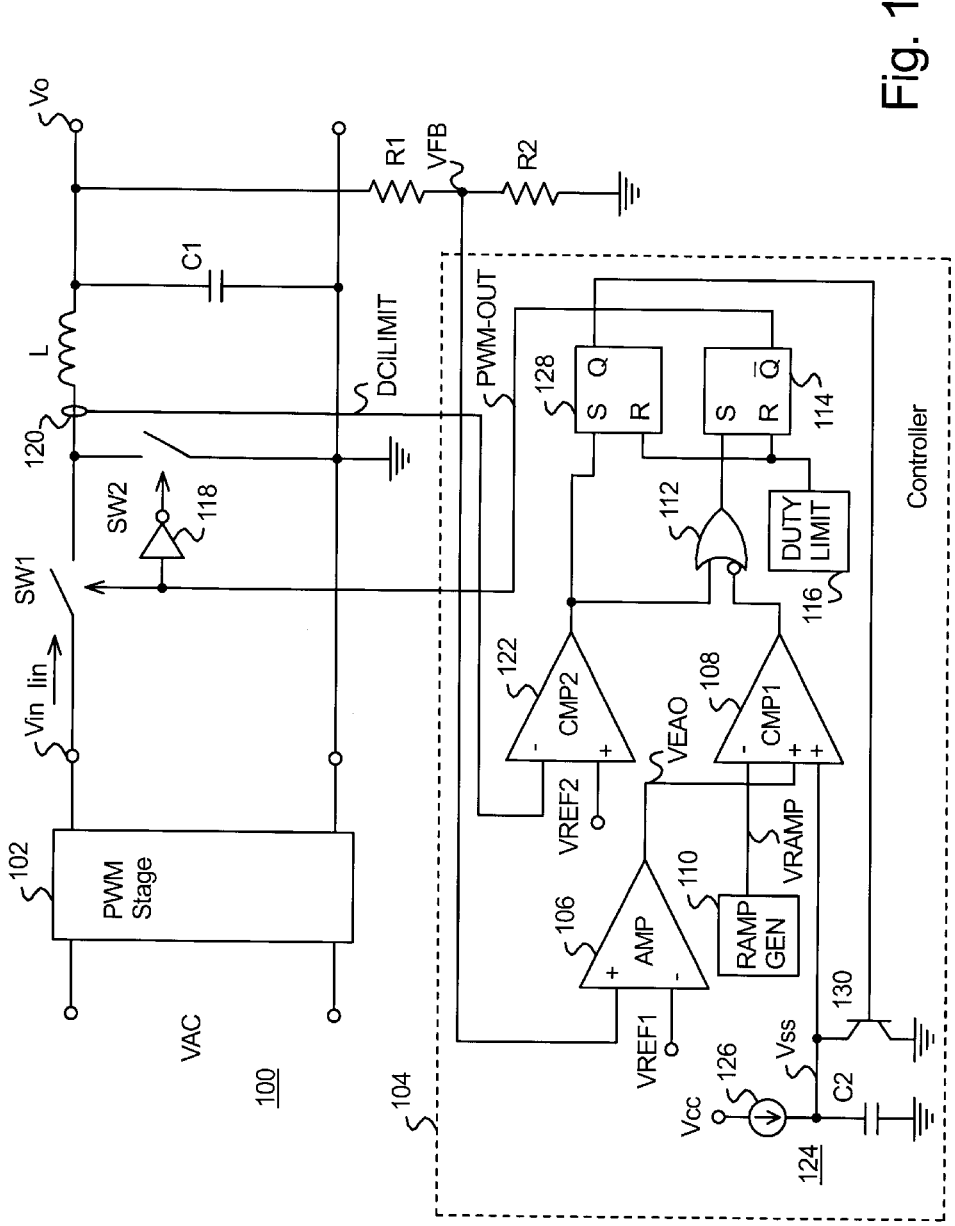
FIG. 1 illustrates a schematic diagram of a power converter in accordance with an aspect of the present invention.

FIG. 1 illustrates a schematic diagram of a power converter 100 in accordance with an aspect of the present invention. An input voltage Vin may be applied to a first terminal of a main power switch SW1 (e.g., a transistor switch). A second terminal of the switch SW1 may be coupled to a first terminal of a second switch SW2 (e.g., a transistor switch) and to a first terminal of an inductor L. A second terminal of the inductor L may be coupled to a first terminal of a capacitor C1. A second terminal of the switch SW2 and a second terminal of the capacitor C1 may be coupled to a ground node. It will be apparent that the switch SW2 may be replaced by a diode.

A source 102 of the input voltage Vin may include a power factor correction (PFC) stage of the power converter 100. Thus, the source 102 may receive an alternating current (AC) signal and perform power factor correction in which current drawn from AC source VAC is maintained substantially in phase with the AC voltage signal so as to present a resistive load to the AC source. It will be apparent, however, that the PFC stage may be omitted, in which case, the input voltage Vin may be provided by another source that provides a regulated voltage, an unregulated voltage or a loosely-regulated voltage.

When the switch SW1 is closed, the switch SW2 is open. Under these conditions, current Iin from the source 102 charges the inductor L with energy. When the switch SW1 is opened, the switch SW2 is closed. Under these conditions, energy from the inductor L charges the capacitor C1 with energy. An output voltage Vo formed across the capacitor C1 may be used to power a load (not shown). The level of power delivered to the load may be adjusted according to the duty cycle of the switches SW1 and SW2.

A controller 104 may control the duty cycle of the switches SW1 and SW2 so as to maintain the output voltage Vo at a desired level. For this purpose, a first terminal of a resistor R1 may be coupled to receive the output voltage Vo. A second terminal of the resistor R1 may be coupled to a first terminal of a resistor R2. A second terminal of the resistor R2 may be coupled to a ground node. Accordingly, the resistors R1 and R2 form a resistive divider in which a feedback signal VFB formed at an intermediate node of the resistive divider is representative of the level of the output voltage Vo.

The feedback signal VFB may be coupled to a first input terminal of an amplifier 106. Reference voltage VREF1 that is representative of a desired level for the output voltage Vo may be coupled to a second input of the amplifier 106. Accordingly, an output of the amplifier 106 forms an error signal VEAO that is representative of a difference between the output voltage Vo and a desired level for the output voltage. The error signal VEAO may be coupled to a first input of a comparator 108. A second input of the comparator 108 may be coupled to receive a periodic ramp signal VRAMP from a ramp generator 110.

The output of the comparator 108 forms a switch control signal VSC. When the level of the ramp signal VRAMP is below the level of the error signal VEAO, the switch control signal VSC may be a logic high voltage. Then, as the ramp signal rises, it eventually exceeds the level of the error signal VEAO. In response, the switch control signal VSC may transition to a logic low voltage until the ramp signal VRAMP is reset and the process repeats. Thus, the duty cycle of the switch control signal VSC is adjusted depending upon the level of the output voltage Vo.

The switch control signal VSC may be coupled to a first (inverting) input of a logic OR gate 112. An output of the logic gate 112 may be coupled to a set input S of a flip-flop or latch 114. A reset input R of the flip-flop 114 may be coupled to receive a periodic clock signal from a duty-cycle limiter 116. A $\overline{Q}$ (inverted) output PWM-OUT of the flip-flop 114 may be coupled to control the switch SW1 and the switch SW2 (via an inverter 118).

When the flip-flop 114 is reset by the duty-cycle limiter 116, the switch SW1 is closed and the switch SW2 is opened. In addition, the ramp signal VRAMP, being synchronized with the periodic clock signal from the duty-cycle limiter 116, is reset to its initial value from which it begins to rise. Under these conditions, the switch control signal VSC is a logic high voltage and the output of the logic gate 112 is a logic low voltage. Then, when the level of the ramp signal VRAMP exceeds the level of the error signal VEAO, the switch control signal VSC transitions to a logic low voltage. As a result, the flip-flop 114 is set and the switch SW1 is opened and the switch SW2 is closed. The switch SW1 remains open and the switch SW2 remains closed until the flip-flop 114 is once again reset by the duty-cycle limiter 116.

The signal PWM-OUT may differ from the signal VSC in that the signal PWM-OUT may be duty-cycle limited by a duty cycle limiter 116. The duty cycle limiter 116 may form a periodic square wave signal whose duty cycle is equivalent to a maximum duty cycle allowed for the switch SW1.

When the output voltage Vo rises, the error signal VEAO also rises. As a result, the switch SW1 remains open for a longer portion of the switching cycle because more time is required for the ramp signal VRAMP to exceed the error signal VEAO. Thus, the switching duty-cycle is reduced which tends to reduce the output voltage Vo. Conversely, when the output voltage Vo falls, the error signal VEAO also falls. As a result, the switch SW1 remains open for a shorter portion of the switching cycle because less time is required for the ramp signal to exceed the error signal VEAO. Thus, the switching duty-cycle is increased which tends to increase the output voltage Vo. Accordingly, the output voltage Vo is regulated in a closed feedback loop.

The power converter 100 of FIG. 1 is exemplary. Thus, it will be apparent that modifications can be made. For example, the exemplary power converter 100 uses trailing-edge modulation, however, leading-edge modulation may be used. As another example, the power converter 100 has buck converter topology. However, another type of converter topology may be used, such as that of a boost converter.

A current sensor 120 may be coupled to sense current in the converter 100. As shown in FIG. 1, the current sensor 120 may sense current in the inductor L. Alternately, the current sensor 120 may sense current in the switch SW1 or the switch SW2. In either case, the current sensor 120 senses a current that is representative of an output current provided to the load. Further, the current sensor 120 may be implemented in a number of different ways. For example, a resistor that is configured to receive the current to be sensed forms a voltage that is representative of the current. As another example, a current may be induced in the secondary winding of a transformer or coupled inductor. Thus, current in the inductor L may be sensed via an induced current in a second inductor (not shown) that is inductively coupled to the inductor L. Further, the current sensor 120 may form a signal that is representative of an average of the sensed current, such as by use of a filter.

The current sensor 120 forms a voltage signal DCILIMIT that is representative of the sensed current. This current-sensing signal may be coupled to a first input of a comparator 122. A second input of the comparator 122 may be coupled to receive a reference voltage VREF2 that is representative of a maximum desired level for the sensed current. An output of the comparator 122 may be coupled to a second input of the logic OR gate 112. Thus, the output of the comparator 122 may open the switch SW1 in the event that a current sensing signal DCI LIMIT exceeds a predetermined level.

As explained above, under normal operating conditions, the comparator 108 compares a signal VFB that is representative of an output voltage Vo of the converter 100 to a periodic ramp signal VRAMP in order to adjust the duty cycle of the switch SW1. Accordingly, the output voltage Vo is regulated in a feedback loop.

Upon start-up, however, a duty cycle limiting circuit arrangement 124 may provide a soft-start in which the duty cycle of the switch SW1 is limited so as to prevent excessive current in the switch SW1. Thus, a soft-start voltage Vss formed across a soft-start capacitor C2 is initially a low voltage level, when the output voltage Vo is significantly lower than the desired level. Over time, a current source 126 charges the capacitor C2. Initially, when the signal Vss is higher than the signal VEAO, the voltage Vss is compared by comparator 108 to the periodic ramp signal VRAMP. As the soft-start signal Vss increases, so does the duty cycle of the switch SW1. As a result, the output voltage Vo increases. Once the level of VEAO rises above the level of Vss, then the comparator 108 compares the signal VFB to the ramp signal VRAMP to control the duty cycle of the switch SW1. Accordingly, the comparator 108 compares the higher one of the two signals Vss and VEAO to the ramp signal VRAMP to control the duty cycle of the switch SW1.

The voltage signal DC ILIMIT is representative of the output current of a PWM stage of the converter 100 and is coupled to the comparator 122. In response to the signal DC ILIMIT exceeding a predetermined level of the reference voltage VREF2 (e.g., 1.0 volt), the comparator 122 opens the switch SW1 via a logic OR gate 112. Optionally, the comparator 122 may be disconnected from the logic OR gate 112 and the logic OR gate 112 may be provided with one less input (or replaced by an inverter). In addition, the output of the comparator 122 may be coupled to a set input of a flip-flop 128. A Q output of the flip-flop 128 may be coupled to a switch 130 (e.g., a MOSFET or bipolar transistor). The switch 130 is coupled across the capacitor C2. Thus, when the output of the comparator 122 changes to a logic high voltage, this sets the flip-flop 128 and closes the switch 130. As a result, the capacitor C2 begins to discharge through the switch 130. The capacitor C2 may be discharged during portions of the clock period used to control switching. In a preferred embodiment, a time constant for discharging the capacitor C2 is such that the capacitor C2 may lose approximately one-third of its voltage level in a single switching cycle. Thus, assuming the switch 130 is implemented by a transistor, the on-resistance relative to the value of the capacitor C2 is sufficient to provide this time constant. If needed, a resistor (not shown) may be coupled in series with the switch 130. A set input of the flip-flop 128 may coupled to an output of the duty cycle limiter 116. Accordingly, the flip-flop 128 is reset at the beginning of the next cycle for the switch SW1. This opens the switch 130. As a result, the current source 126 begins to charge the capacitor C2.

Thus, in the event of a "hard" short in the load, in which the load impedance falls to nearly zero, the capacitor C2 will be discharged to nearly ground level within a few switching cycles. As a result, the duty cycle of the switch SW1 will be limited further by operation of the comparator 108 than by the comparator 122. In the event of a "soft short" in which the load impedance falls below expected levels, but not to zero, then the capacitor C2 will not be completely discharged. As a result, the duty cycle of the switch SW1 will be less limited than in the event of a hard short. Thus, under these conditions, the output voltage may continue to be regulated. It will be apparent, therefore, that the duty cycle of the switch SW1 (and the switch SW2) may be limited by an amount that is related to the level of the output current and, thus, the degree of the fault.

Figure 2:
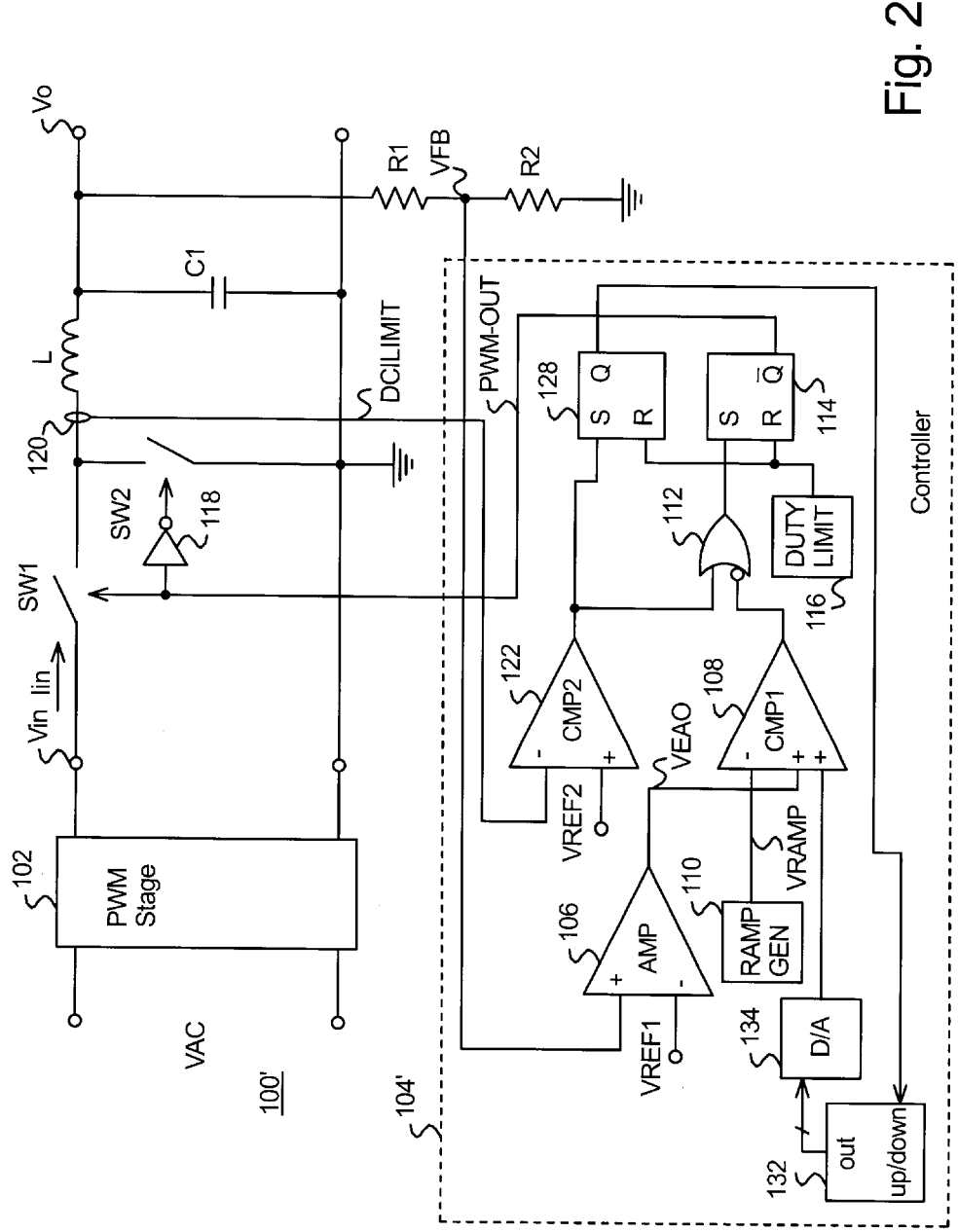
FIG. 2 illustrates a schematic diagram of an alternate embodiment of a power converter in accordance with an aspect of the present invention.

FIG. 2 illustrates a schematic diagram of an alternate embodiment of a power converter 100' in accordance with an aspect of the present invention. As shown in FIG. 2, the soft-start capacitor C2 and current source 126 of the duty cycle limiter of FIG. 1 may be replaced with a counter 132 having its output coupled to a digital-to-analog converter 134. An output of the digital-to-analog converter 134 may be coupled to the input of comparator 108 in place of the signal Vss. Upon start-up, the counter 132 may begin counting (e.g., counting up from zero). When the output of the comparator 122 is a logic high voltage, the counter 132 may be reset to zero or to some other value in order to limit the duty cycle in the event of fault which causes an excessive output current. Alternately, during periods that the Q output of the flip-flop 128 is a logic high voltage, the counter 132 may be programmed to change the count gradually (e.g., by counting down). When the output of the analog to digital converter 134 goes beyond a limit set by the feedback signal VEAO, the output of the analog to digital converter 134 may control the duty cycle in accordance with the count.

Figure 3A:
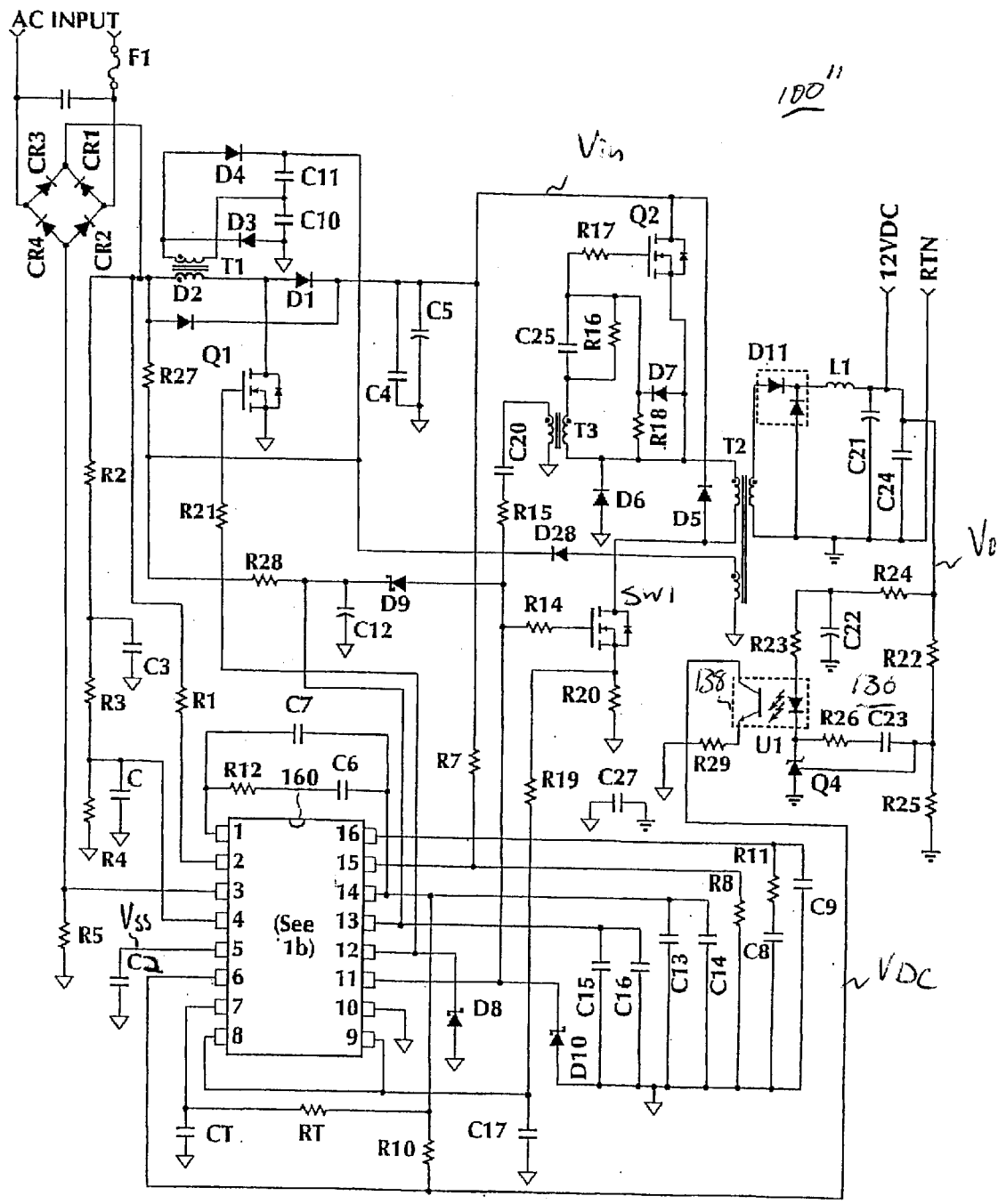
FIGS. 3a and 3b illustrate a schematic diagram of a two-stage power factor correction and pulse width modulation power converter in accordance with an aspect of the present invention.
Figure 3B:
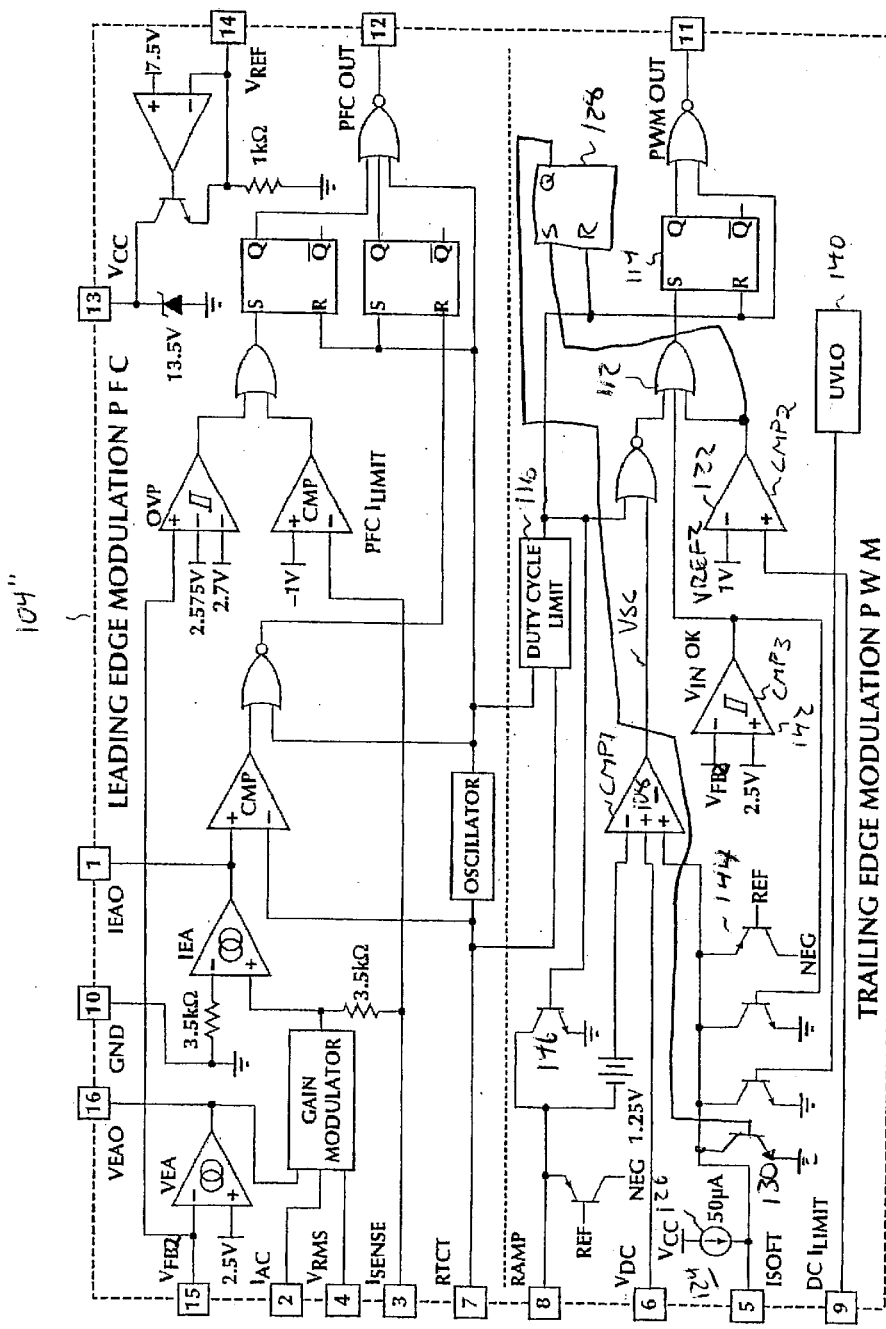

FIGS. 3a and 3b illustrate a schematic diagram of a two-stage power factor correction and pulse width modulation power converter 100" in accordance with an aspect of the present invention. The controller 104" of FIG. 3b differs from the controller 104 of FIG. 1 and the controller 104' of FIG. 2 principally in that the controller 104" of FIG. 3a includes a PFC section for controlling switching of a PFC stage of the converter 100" of FIGS. 3a and 3b in addition to a pulse-width modulation (PWM) section. In addition, rather than using a resistive divider for sensing an output voltage Vo, as in FIGS. 1 and 2, the converter 100" of FIGS. 3a and 3b may include a feedback arrangement 136 that having an optical isolator 138 for forming a signal VDC. The signal VDC is representative of a difference between the output voltage Vo and a desired level for the output voltage.

As shown in FIG. 3a, an under-voltage lock out (UVLO) element 140 may maintain the voltage Vss across the soft-start capacitor C2 at a low level when the controller 104" does not have sufficient voltage at its Vcc supply for powering circuitry of the controller 104". A comparator 142 may also maintain the voltage across the soft-start capacitor C2 at a low level when a voltage Vin developed by the PFC stage is below a predetermined level. Thus, the elements 140 and 142 ensure that the voltage across the capacitor C2 is not allowed to begin gradually increasing for start-up until the converter 100" is appropriately conditioned to enter start-up mode. The elements 140 and 142 generally do not affect the switching duty cycle once start-up has commenced. Rather, as explained above, the duty cycle is generally adjusted in a closed feedback loop according to a level of the output voltage Vo, unless a fault occurs. When a fault occurs that results in an excessive current in the PWM stage, the comparator 122 may initiate the discharging phases of the capacitor C2, thereby reducing the switching duty cycle and, thus, the current. Further, a transistor 144 may be provided to limit the voltage across the capacitor C2.

Excessive current in the PWM stage of the converter 100" of FIGS. 3a and 3b may be sensed via a voltage formed across resistor R20. The resistor R20 is coupled in series with the switch SW1. Accordingly, the current through the switch SW1 is sensed by forming a voltage across the resistor R20. A resistor R19 and a capacitor C17 are configured such that a current that is representative of the sensed current may charge the capacitor C17 during each switching cycle. The capacitor C17 may be discharged once for each switching cycle by a transistor 146 which is coupled to receive the duty-limit signal from the duty cycle limiter 116. Accordingly, the voltage on the capacitor C17 may be used to form the ramp signal VRAMP which is applied to the comparator 108 for controlling the switching duty cycle in the PWM stage. In addition, the voltage on the capacitor C17 may also be applied to the comparator 122 for determining whether the sensed current is excessive. More particularly, the comparator 122 compares the voltage across the capacitor (which is representative of the current through the switch SW1), to the reference level VREF2.

Figure 4:
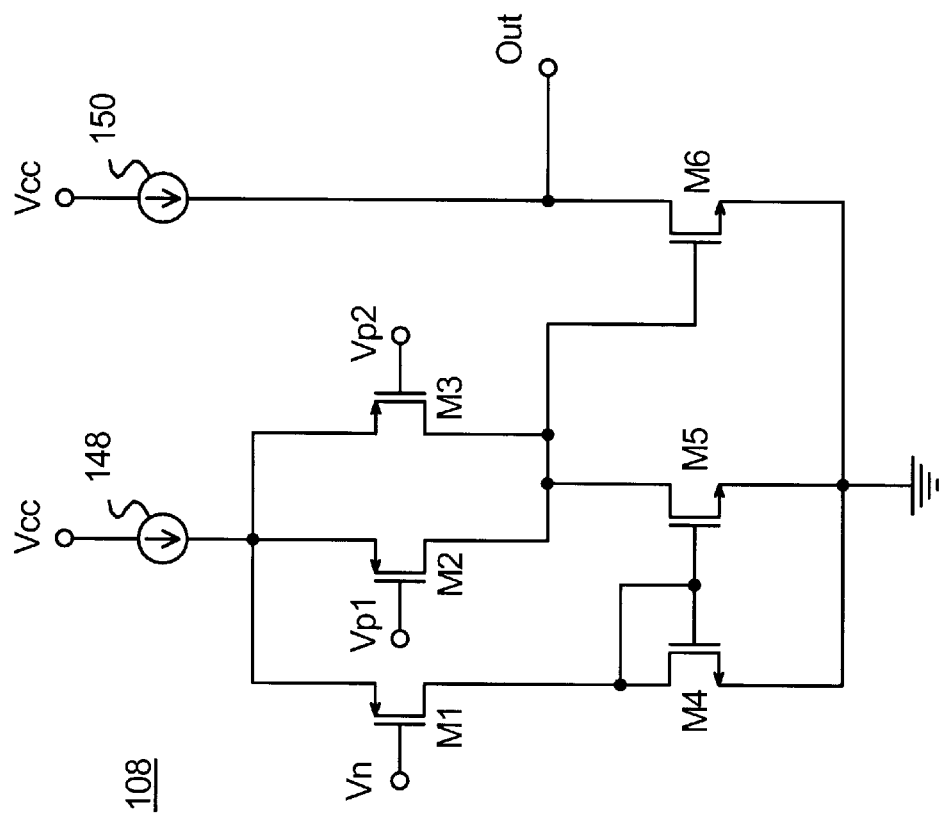
FIG. 4 illustrates an exemplary three-input comparator that may be used with the power converters of the present invention.

FIG. 4 illustrates an exemplary embodiment of the three-input comparator 108 in accordance with an aspect of the present invention. A current source 148 may be coupled to a source of P-type transistors M1, M2 and M3. A drain of the transistor M1 may be coupled to a drain of an N-type transistor M4. Drains of the transistors M2 and M3 may be coupled together, to a drain of an N-type transistor M5 and to a gate of an N-type transistor M6. A current source 150 may be coupled to a drain of the transistor M6. Sources of the transistors M4, M5 and M6 may be coupled to a ground node.

An inverting input Vn for the comparator 108 may be at the gate of transistor M1. A first non-inverting input Vp1 for the comparator 108 may be at the gate of transistor M2. A second non-inverting input Vp2 for the comparator 108 may be at the gate of the transistor M3. Accordingly, referring to FIGS. 1–3, the signal VEAO may be coupled to the gate of the transistor M1, the signal VRAMP may be coupled to the gate of the transistor M2 and the signal Vss may be coupled to the gate of the transistor M3. An output for the comparator 108 may be at the drain of the transistor M6. Accordingly, referred to FIGS. 1–3, the drain of the transistor M6 may be coupled to the logic gate 112.

The comparator 108 of FIG. 4 is exemplary. Accordingly, it will be apparent that another embodiment of the comparator 108 may be used.

Figure 5A:
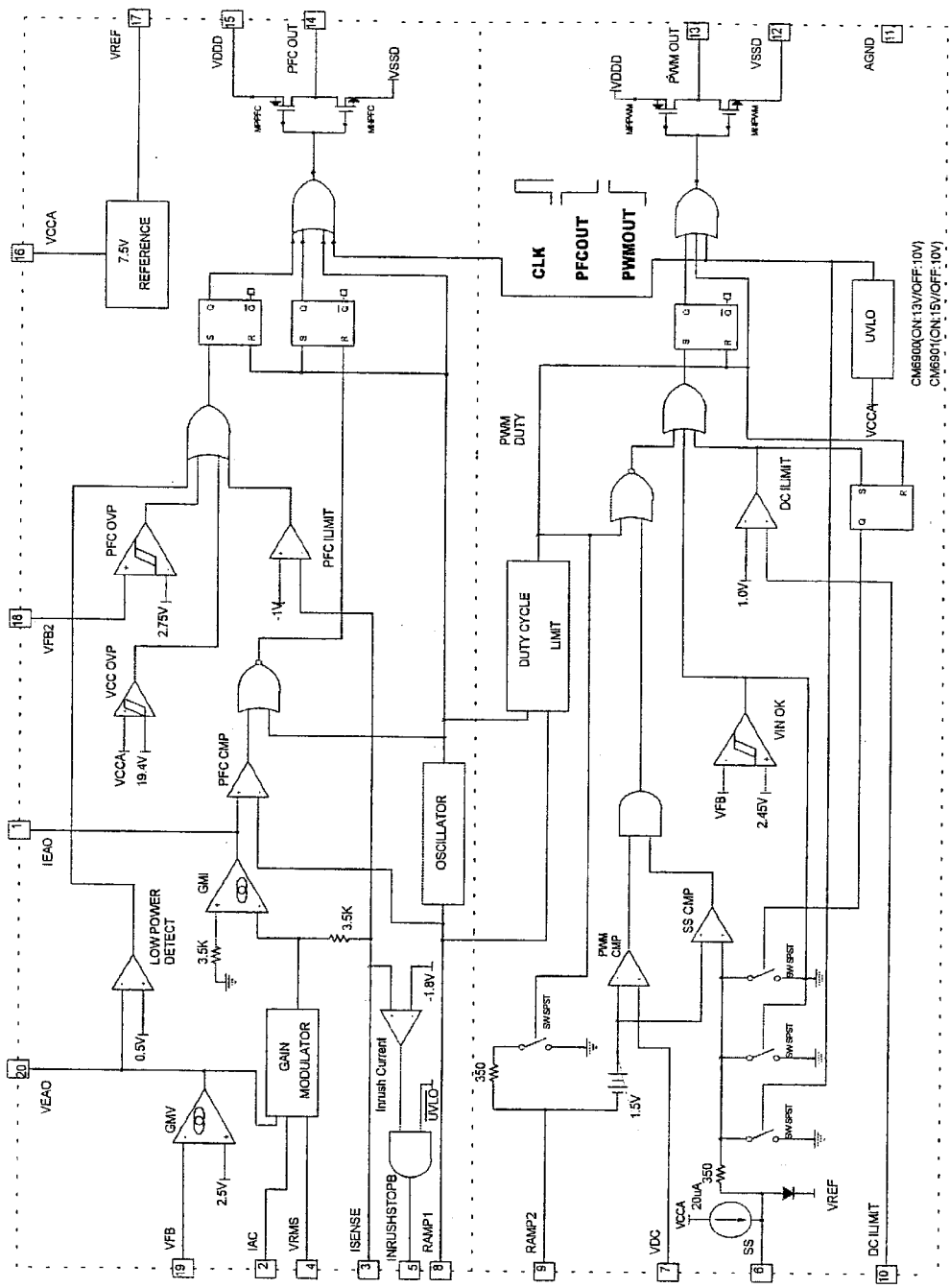
FIGS. 5a and 5b illustrate a schematic diagram of a two-stage power factor correction and pulse width modulation power converter in accordance with an aspect of the present invention.
Figure 5B:
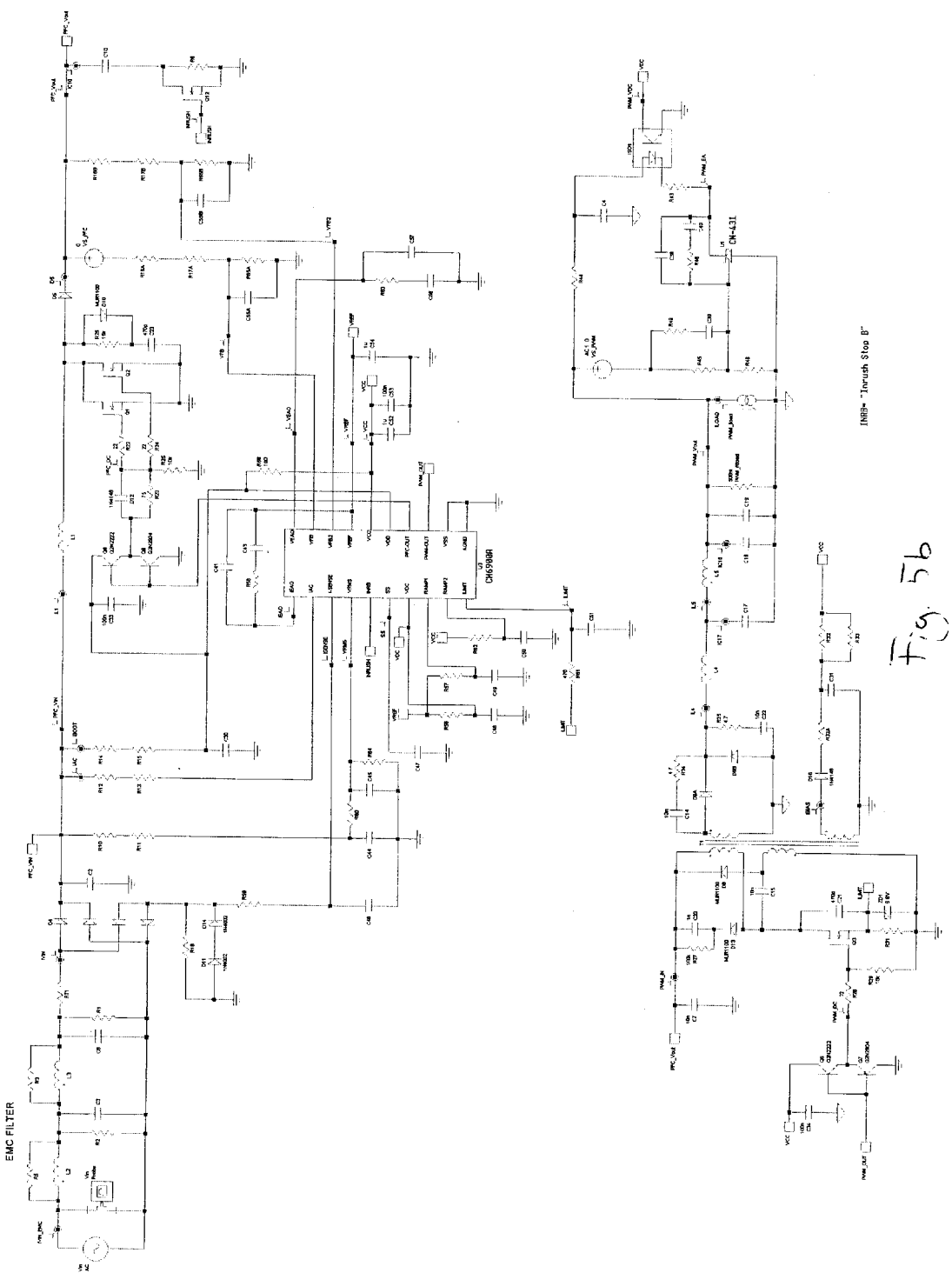

FIGS. 5a and 5b illustrate a schematic diagram of a two-stage power factor correction and pulse width modulation power converter in accordance with an aspect of the present invention. An example of such a power converter is available under part number CM6900 from Champion Microelectronic Corporation, located at 4020 Moorpark Avenue, Suite 105, San Jose, Calif.

Advantages of the invention include further limiting power dissipation in the event of an excessive current condition and an ability to continue to regulate the output voltage in the event of certain excessive current conditions.

Thus, while the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A switching power converter for providing a load with an output current and voltage, comprising:
   a switch for transferring energy from a source to the load by opening and closing the switch according to a duty cycle; and
   a duty cycle limiter coupled to the switch wherein the duty cycle limiter is triggered when the output current exceeds a predetermined level, the duty cycle limiter including a capacitor having a charge that is gradually changed in response to the output current exceeding the predetermined level and wherein the duty cycle is related to a voltage on the capacitor.

2. The power converter according to claim 1, wherein a time constant for changing the charge on the capacitor is such that a voltage across the capacitor is changed by approximately one-third for each switching cycle that the duty cycle limiter is triggered.

3. The power converter according to claim 1, further comprising a sensor for sensing the output current.

4. The power converter according to claim 3, wherein the sensor is resistive.

5. The power converter according to claim 3, wherein the sensor is inductive.

6. The power converter according to claim 3, further comprising a comparator for comparing the output current to the predetermined level wherein the charge on the capacitor is changed according to an output of the comparator.

7. The power converter according to claim 3, wherein the capacitor is charged by constant current source and discharged in response to the duty cycle limiter being triggered.

8. The power converter according to claim 1, further comprising a comparator for controlling the duty cycle of the switch by comparing a feedback signal that is representative of the output voltage to a periodic ramp signal.

9. The power converter according to claim 8, wherein when the voltage across the capacitor goes beyond a limit set by the feedback signal in response to changing the charge on the capacitor, the voltage across the capacitor controls the duty cycle.

10. The power converter according to claim 8, wherein the periodic ramp signal is representative of the output current.

11. The power converter according to claim 10, wherein the duty cycle limiter is triggered when the periodic ramp signal exceeds a predetermined level.

12. The power converter according to claim 1, wherein the duty cycle limiter provides a soft-start in which the switching duty cycle is gradually increased upon power-up.

13. The switching power converter according to claim 1, further comprising a power factor correction section.

14. A switching power converter for providing a load with an output current and voltage comprising a switch for transferring energy from a source to the load by opening and closing the switch according to a duty cycle wherein when the output current reaches an excessive level, the duty cycle is limited to an amount that is related to a degree to which the output current is excessive by duty cycle limiter that is triggered when the output current exceeds a predetermined level.

15. The power converter according to claim 14, wherein the duty cycle limiter comprises a capacitor in which a charge on the capacitor is gradually changed when the duty cycle limiter is triggered and wherein the duty cycle is related to a voltage on the capacitor.

16. The power converter according to claim 14, wherein the duty cycle limiter comprises a counter that initiated to count when the duty cycle limiter is triggered and wherein the duty cycle is related to a count of the counter.

17. A switching power converter for providing a load with an output current and voltage, comprising
   a switch for transferring energy from a source to the load by opening and closing the switch according to a duty cycle; and
   a duty cycle limiter coupled to the switch wherein the duty cycle limiter is triggered when the output current exceeds a predetermined level, the duty cycle limiter including a counter and wherein the duty cycle is related to a count of the counter.

18. The power converter according to claim 17, wherein a count of counter is gradually changed in response to the duty cycle limiter being triggered.

19. The power converter according to claim 18, further comprising a sensor for sensing the output current.

20. The power converter according to claim 19, wherein the sensor is resistive.

21. The power converter according to claim 19, wherein the sensor is inductive.

22. The power converter according to claim 19, further comprising a comparator for comparing the output current to the predetermined level wherein the counter is initiated to count according to an output of the comparator.

23. The power converter according to claim 18, further comprising a comparator for controlling the duty cycle of the switch by comparing a feedback signal that is representative of the output voltage to a periodic ramp signal.

24. The power converter according to claim 23, further comprising an analog to digital converter for converting the count to a voltage and wherein when the voltage at the digital to analog converter goes beyond a limit set by the feedback signal, the voltage at the digital to analog converter controls the duty cycle.

25. The power converter according to claim 23, wherein the periodic ramp signal is representative of the output current.

26. The power converter according to claim 25, wherein the duty cycle limiter is triggered when the periodic ramp signal exceeds a predetermined level.

27. The power converter according to claim 17, wherein the duty cycle limiter provides a soft-start in which the switching duty cycle is gradually increased upon power-up.

28. The switching power converter according to claim 17, further comprising a power factor correction section.

29. A switching power converter for providing a load with an output current and voltage, comprising:
   a switch for transferring energy from a source to the load by opening and closing the switch according to a duty cycle; and
   a duty cycle limiter coupled to the switch wherein the duty cycle limiter is triggered when the output current exceeds a predetermined level, the duty cycle limiter including a capacitor having a charge that is gradually changed in response to the output current exceeding the predetermined level and wherein the duty cycle is related to a voltage on the capacitor and wherein the capacitor is charged by constant current source and discharged in response to the duty cycle limiter being triggered.

30. The power converter according to claim 29, wherein a time constant for changing the charge on the capacitor is such that a voltage across the capacitor is changed by approximately one-third for each switching cycle that the duty cycle limiter is triggered.

31. The power converter according to claim 29, further comprising a sensor for sensing the output current.

32. The power converter according to claim 31, further comprising a comparator for comparing the output current to the predetermined level wherein the charge on the capacitor is changed according to an output of the comparator.

33. The power converter according to claim 29, further comprising a comparator for controlling the duty cycle of the switch by comparing a feedback signal that is representative of the output voltage to a periodic ramp signal.

34. The power converter according to claim 33, wherein when the voltage across the capacitor goes beyond a limit set by the feedback signal in response to changing the charge on the capacitor, the voltage across the capacitor controls the duty cycle.

35. The power converter according to claim 33, wherein the periodic ramp signal is representative of the output current.

36. The power converter according to claim 35, wherein the duty cycle limiter is triggered when the periodic ramp signal exceeds a predetermined level.

37. The power converter according to claim 29, wherein the duty cycle limiter provides a soft-start in which the switching duty cycle is gradually increased upon power-up.

38. The switching power converter according to claim 17, further comprising a power factor correction section.

39. A switching power converter for providing a load with an output current and voltage, comprising:
   a switch for transferring energy from a source to the load by opening and closing the switch according to a duty cycle;
   a current sensor for sensing a current that is representative of an output current provided to the load; and
   a duty cycle limiter coupled to the switch wherein the duty cycle limiter is triggered when the output current exceeds a predetermined level, the duty cycle limiter including a capacitor having a charge that is gradually changed in response to the output current exceeding the predetermined level and wherein the duty cycle is related to a voltage on the capacitor.

40. The power converter according to claim 39, wherein a time constant for changing the charge on the capacitor is such that a voltage across the capacitor is changed by approximately one-third for each switching cycle that the duty cycle limiter is triggered.

41. The power converter according to claim 39, wherein the sensor is resistive.

42. The power converter according to claim 39, wherein the sensor is inductive.

43. The power converter according to claim 39, further comprising a comparator for comparing the output current to the predetermined level wherein the charge on the capacitor is changed according to an output of the comparator.

44. The power converter according to claim 39, wherein the capacitor is charged by constant current source and discharged in response to the duty cycle limiter being triggered.

45. The power converter according to claim 39, further comprising a comparator for controlling the duty cycle of the switch by comparing a feedback signal that is representative of the output voltage to a periodic ramp signal.

46. The power converter according to claim 45, wherein when the voltage across the capacitor goes beyond a limit set by the feedback signal in response to changing the charge on the capacitor, the voltage across the capacitor controls the duty cycle.

47. The power converter according to claim 45, wherein the periodic ramp signal is representative of the output current.

48. The power converter according to claim 47, wherein the duty cycle limiter is triggered when the periodic ramp signal exceeds a predetermined level.

49. The power converter according to claim 39, wherein the duty cycle limiter provides a soft-start in which the switching duty cycle is gradually increased upon power-up.

50. The switching power converter according to claim 39, further comprising a power factor correction section.

* * * * *